United States Patent [19]

Hoffmann

[11] Patent Number: 4,765,422
[45] Date of Patent: Aug. 23, 1988

[54] BATHROOM SCALE

[75] Inventor: Erich Hoffmann, Bergisch Gladbach, Fed. Rep. of Germany

[73] Assignee: Robert Krups Stiftung & Co. KG., Solingen, Fed. Rep. of Germany

[21] Appl. No.: 56,852

[22] Filed: Jun. 1, 1987

[51] Int. Cl.⁴ .......................... G01G 3/14; G01L 1/22
[52] U.S. Cl. ......................................... 177/211; 338/2
[58] Field of Search .............................. 177/165, 211; 204/192.21; 338/2

[56] References Cited

U.S. PATENT DOCUMENTS

| | | | |
|---|---|---|---|
| 2,899,191 | 8/1959 | Hunt | 177/211 |
| 4,313,510 | 2/1982 | Tomlinson, Jr. | 177/165 |
| 4,433,741 | 2/1984 | Ryckman, Jr. | 177/211 X |
| 4,545,881 | 10/1985 | Shinmi et al. | 204/192.21 X |
| 4,586,018 | 4/1986 | Bettman | 338/2 X |

Primary Examiner—George H. Miller, Jr.
Attorney, Agent, or Firm—Peter K. Kontler

[57] ABSTRACT

A scale wherein a platform is mounted on and is movable and/or deformable with reference to a base in response to the application of a load, such as the weight of a person standing on the platform. A strain gauge is mounted on a plate-like carrier on the base or directly at the underside of the platform, and its resistor is a thick film conductor whose resistance changes proportionally with the magnitude of the load which is applied to the platform. Such change of resistance is used to change the position of a pointer with reference to a scale which is calibrated to indicate the magnitude of the applied load.

8 Claims, 1 Drawing Sheet

BATHROOM SCALE

BACKGROUND OF THE INVENTION

The invention relates to weighing devices in general, and more particularly to improvements in weighing devices (hereinafter called scales for short) which employ strain gauges. Still more particularly, the invention relates to improvements in scales (including bathroom scales) wherein a platform can be acted upon by a selected load (such as the weight of a person standing on the platform) to change its position relative to a base (either entirely or in part) whereby the extent of displacement is proportional to the magnitude of the load. The displacement is ascertained by the strain gauge wherein an electric resistor changes its resistance to the flow of electric current at a rate which is a function of the extent of displacement (e.g., deformation) of the platform with reference to the base. The change of resistance is used to furnish indications denoting the magnitude of the applied load.

In certain presently known scales of the above outlined character, the platform is in two-point contact with a carrier in the base, and the strain gauge is located midway between the two points of contact. The gauge has an ohmic resistance which constitutes a transducer by generating an electric signal which is proportional to the magnitude of applied load, and the signal is amplified and used to change the position of a pointer or hand with reference to a graduated scale serving to indicate the magnitude of the applied load. The transducer has a support which is made of paper, a plastic material or the like and carries a wire-like resistor. The support is bonded to the carrier which is mounted in the base and supports the platform. The means for bonding the support to the carrier is a two-component synthetic resin adhesive which is sensitive to moisture. Therefore, the strain gauge is furnished as a separate part which is confined in a waterproof envelope consisting of wax, rubber, plastic or the like. It is considered necessary to place the resistor of the strain gauge exactly midway between the points of contact of the carrier with the underside of the platform. The resistor of the strain gauge is relatively short, and even minor deviations of the position of such resistor from an optimum position will result in extensive distortion of the results of measurements.

It has been found that the just described types of strain gauges often fail to operate satisfactorily, either because they are overly sensitive to moisture or because they furnish misleading measurements due to inaccurate mounting of the resistor. Moreover, they cannot be mass-produced at a reasonable cost.

OBJECTS AND SUMMARY OF THE INVENTION

An object of the invention is to provide a scale which employs a strain gauge and to construct and assemble the strain gauge in such a way that it is less affected by moisture than a conventional strain gauge and that its accuracy exceeds that of heretofore known gauges.

Another object of the invention is to provide a scale which need not employ any parts which must cover large distances and wherein the strain gauge is much less sensitive to external influences and/or eventual deviations of its mounting from an optimum position than in heretofore known scales.

A further object of the invention is to provide a novel and improved mounting of the strain gauge in the above outlined scale.

An additional object of the invention is to provide a novel and improved resistor for use in the strain gauge of the above outlined scale.

A further object of the invention is to provide a bathroom scale which embodies the above outlined features and is simpler and less expensive but more reliable and more rugged than heretofore known bathroom scales.

Another object of the invention is to provide a scale which can be mass produced without affecting the accuracy of its measurements and indications.

The improved scale is particularly suitable for use as a bathroom scale and comprises a ground- or floor-contacting base member, a platform member which is mounted on the base member to descend and/or to undergo deformation in response to the application of a load thereto, and a strain gauge which is mounted on one of the members and includes an electrical resistor which is placed under strain in response to the application of a load to the platform to thereby change its resistance to the flow of electric current therethrough to an extent which is proportional to the magnitude of the applied load. In accordance with a feature of the invention, the resistor includes or constitutes a so-called thick film conductor. At least a portion of such conductor can have an undulate shape.

The base member comprises or carries at least two spaced-apart supports which directly or indirectly carry the platform member, and the thick film conductor can extend substantially all the way between such supports.

The scale can further comprise a carrier whcih is disposed between the base member and the platform member and supports the platform member so that the carrier undergoes deformation in response to the application of a load to the platform member and the extent of deformation is a function of the magnitude of the applied load. The thick film conductor can be provided on (e.g., bonded to) the carrier. Alternatively, the thick film conductor can be applied directly to that side of the platform member which faces the base member.

The scale can further comprise a zero point selector including a microprocessor which is connected with the conductor and is provided on the one member (i.e., on the carrier which rests on the base member or at the underside of the platform member).

The scale can further comprise a graduated scale which is calibrated to indicate the magnitude of the load upon the platform member, a mobile pointer which is adjacent the calibrated scale, and means for moving the pointer with reference to the calibrated scale including an energy source and amplifier means in circuit with the conductor.

The conductor can contain a silver-palladium alloy, platinum, gold, bismuth, ruthenate and/or ruthenimum oxide.

The novel features which are considered as characteristic of the invention are set forth in particular in the appended claims. The improved scale itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
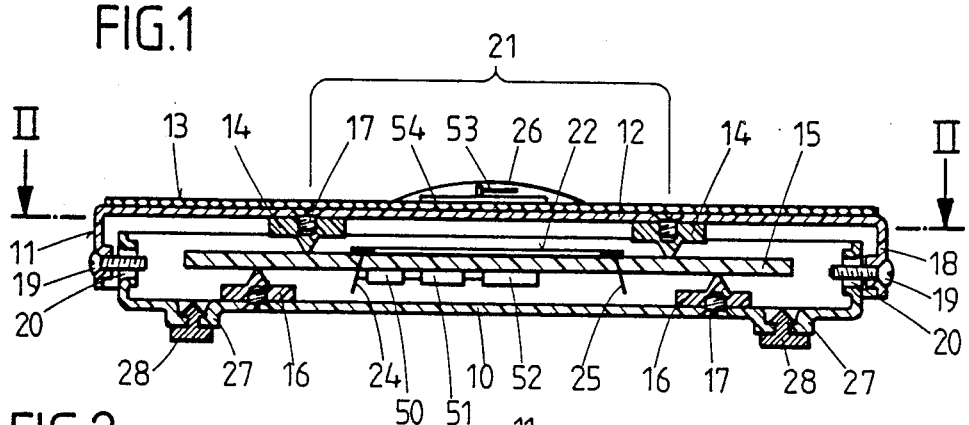
FIG. 1 is a vertical sectional view of a bathroom scale which embodies one form of the invention and wherein the strain gauge is mounted on a carrier which is supported by the base, the section being taken in the direction of arrows as seen from the line I—I of FIG. 2.
Figure 2:
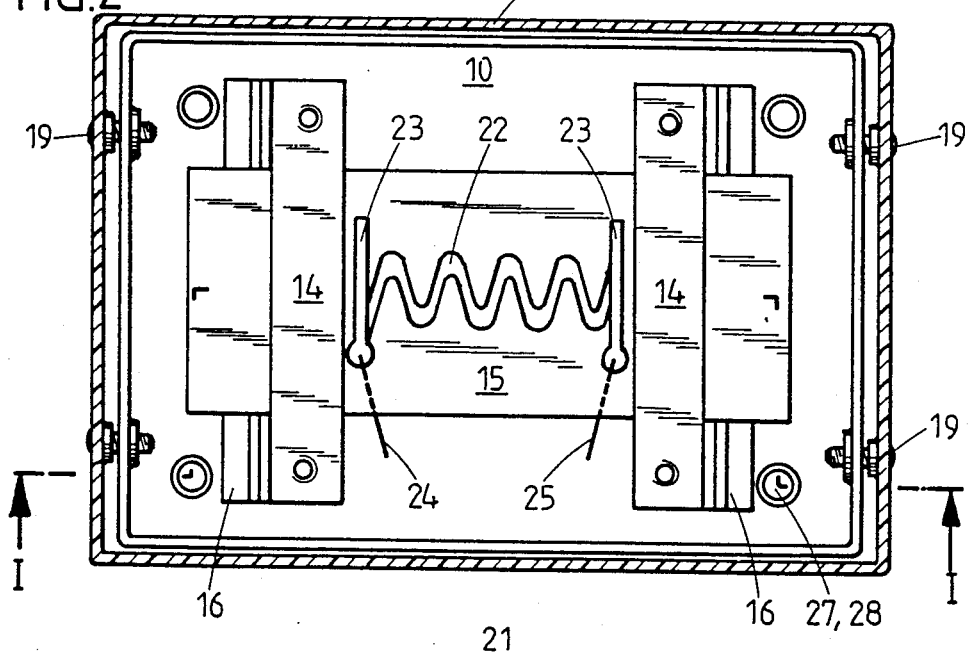
FIG. 2 is a horizontal sectional view as seen in the direction of arrows from the line II—II of FIG. 1.

FIGS. 1 and 2 show a bathroom scale which embodies one form of the invention and comprises a lower portion or base 10 with ground- or floor-contacting pads 28 in the form of plugs made of rubber or plastic material, a plate-like carrier 15 which rests on the central portion of the base 10, and an upper portion 11 including a platform 12 which rests on the carrier 15 and the upper side of which is or can be provided with a layer 13 of carpeting or another material which enhances the appearance of the scale and/or enhances the comfort of the person standing on the platform 12. The underside of the platform 12 carries two knife edge bearings 14 which rest on spaced-apart portions of the upper side of the carrier 15. The carrier 15 rests on two spaced-apart supports 16 which are provided therefor on the base 10 beneath the bearings 14. The distance between the supports 16 exceeds the distance between the bearings 14, and the bearings are disposed between the supports so that the carrier 15 is flexed between the supports 16 in response to the application of a load by way of the bearings 14, i.e., in response to the application of a load to the platform 12 so that the latter descends slightly and deforms the carrier 15 whereby the latter assumes a substantially concave-convex shape with the concave side facing upwardly toward the underside of the platform 12. Flathead screws 17 can be used to secure the bearings 14 to the underside of the platform 12 and also to secure the supports 16 to the upper side of the median portion of the base 10.

In order to prevent complete separation of the base 10 from the platform 12, the downwardly extending marginal portion 18 of the platform 12 overlaps and surrounds the upwardly extending marginal portion of the base 10 and carries screws 19 or analogous fasteners whose shanks extend into slots 20 in the marginal portion of the base with a certain freedom of movement of the platform toward and away from the base as is necessary to flex and/or otherwise deform the carrier 15 between the supports 16 in response to the application of a load to the upper side of the platform. The connection between the base 10 and the platform 12 can comprise two coaxial fasteners 19 at opposite sides of the base.

That portion of the carrier 15 which extends between the bearings 14 can be said to define a measuring zone 21 wherein the carrier 15 supports a strain gauge including an electric resistor in the form of a meandering thick film conductor 22. The end portions of the conductor 22 are immediately or closely adjacent the bearings 14 and are connected with terminals 23 connected to electrical conductors 24, 25 leading to an amplifier 50 and an energy source 51. The amplifier 50 and the energy source 51 can be mounted on the carrier 15 together with a zero setting device including a microprocessor 52 in circuit with the source 51. The microprocessor 52 is further connected with a pointer 53 which is movable with reference to a graduated scale 54. The scale 54 is calibrated to enable the pointer 53 to indicate the magnitude of the load which is applied to the platform 12 and causes a deformation of the carrier 15 with attendant proportional change of resistance of the thick film conductor 22. The reference character 26 denotes a light-transmitting dome above the calibrated scale 54.

The thick film conductor 22 can be applied to the upper side of the carrier 15 in the following way: The carrier 15 is or can be made of steel, and at least its upper side is coated with a pulverulent ceramic material which can be applied electrophoretically and is thereupon baked to adhere to the carrier. The material of the conductor 22 is of pasty consistency and is applied over the layer of ceramic material. In accordance with a presently preferred embodiment, the material which is to form the conductor 22 contains a binder of glass or oxides, a pressure carrier containing one or more organic materials, as well as at least one substance which is selected from the group consisting of platinum, gold, bismuth, ruthenate and ruthenium oxide. One of the presently preferred materials for making the conductor 22 contains a silver palladium alloy. The paste can be applied in a screen printing machine, and the thus applied undulate conductor 22 is thereupon dried to promote the evaporation of solvents prior to being baked to the insulating substrate of baked ceramic powder.

When a load is applied to the platform 12 by way of the carpet layer 13 (e.g., when a person steps on the platform), the carrier 15 undergoes a deformation which is proportional to the applied load (such load is transmitted by the knife edge bearings 14), whereby the length of the conductor 22 changes to bring about a proportional change of its resistance. This is detected by the circuit including the conductors 24, 25, the amplifier 50, the energy source 51 and the microprocessor 52 whereby the changed position of the pointer 53 with reference to the graduated scale 54 denotes the magnitude of the applied load. The person standing on the platform 12 can detect the position of the pointer 53 through the dome 26.

Figure 3:
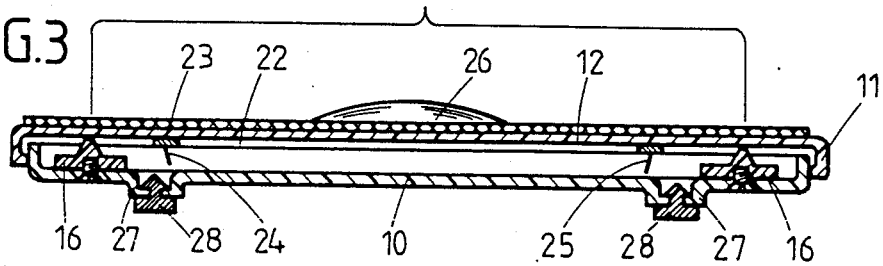
FIG. 3. is a vertical sectional view of a modified scale wherein the strain gauge is mounted at the underside of the platform and the carrier is omitted.

FIG. 3 shows a modified bathroom scale wherein the carrier 15 of the scale of FIGS. 1-2 is omitted and the strain gauge including the thick film conductor 22 is applied to the underside of the platform 12 which forms part of the upper portion 11 of the scale. The underside of the platform 12 rests on supports 16 which are screwed to the median portion of the base 10. The manner (not shown) in which complete separation of the platform 12 from the base 10 is prevented is, or can be, the same as described in connection with FIGS. 1-2. The conductor 22 is elongated and extends substantially the full length of the measuring zone 21 between the supports 16. The conductor 22 undergoes deformation in response to deformation of the platform 12 between the supports 16 as a result of the application of a load to the upper side of the platform.

The base 10 in each of the two embodiments of the improved scale can be made of a metallic sheet material (e.g., steel sheet stock) or of a suitable plastic material. Each of the four corners of the base 10 is provided with a downwardly extending leg 27 for the aforementioned plug-like ground- or floor-contacting pad 28. The material of the pads 28 preferably exhibits a high coefficient of friction in order to reduce the likelihood of slippage of the scale along the bathroom floor.

In each of the illustrated embodiments, the movements of the platform 12 with reference to the base 10 can be limited in a manner as shown at 18–20 in FIGS. 1–2 and/or in a number of different ways. For example, the marginal portion 18 of the platform 12 can be designed to fit snugly around the upwardly extending marginal portion of the base 10 to thus prevent stray movements of the platform. Such stray movements can be further prevented by utilizing suitable guide pins and the like. Alternatively, the lower edge of the downwardly extending marginal portion of the platform 12 can have an inturned bead to engage a shoulder of the marginal portion of the base 10 and to thus even more reliably hold the parts 10, 12 against stray movements relative to and/or against complete separation from each other. Accurate guidance of the platform 12 ensures that the measuring zone 21 remains in a selected optimum position. The thick film conductor 22 is responsive to stretching, compression, twisting and/or other types of deformation of the carrier 15 or platform 12.

An important advantage of the thick film conductor 22 and of a strain gauge which employs the conductor 22 is that the strain gauge can be mass-produced and can be applied to the carrier 15 or to the platform 12 in a time-saving operation. Moreover, the sensitivity and accuracy of the strain gauge is much more satisfactory than that of conventional strain gauges because the conductor 22 is relatively long. Still further, the accuracy of the scale is less affected by minor deviations of the position of the measuring zone 21 from an optimum position. Machines (such as screen printing machines) which can be used to apply paste to the carrier 15 or to the platform 12 in order to form the conductor 22 are available on the market.

The microprocessor 52 not only serves for zero point determination but can also serve as an additional or sole amplifier of the signal which is generated by the conductor 22 and is indicative of the load upon the platform 12. The mounting of such microprocessor directly at one side of the carrier 15 or at the underside of the platform 12 contributes to simplicity and lower cost of the improved scale.

Microprocessors used in the scale of the invention for amplification of the change in voltage and for zero-point definition, are commercially available under the type reference HM CS Serie 400 and are distributed by Messrs. HITACHI.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A scale, particularly a bathroom scale, comprising a base member; a platform member which is mounted on the base member so that at least a portion thereof is displaced with reference to the base member in response to the application of a load thereto; and a strain gauge mounted on one of said members and including an electrical resistor which is placed under strain in response to the application of a load to said platform to thereby change its resistance to an extent which is a function of the magnitude of the load, said resistor including a thick film conductor and said one member including a body of steel and an insulator between said body and said thick film conductor.

2. The scale of claim 1, further comprising two spaced-apart supports for said platform member on said base member, said thick film conductor extending substantionally all the way between said supports.

3. The scale of claim 1, wherein said body comprises a carrier disposed between said members and supporting said platform member so that the carrier undergoes deformation in response to the application of a load to said platform member and the extent of deformation of said carrier is proportional to the magnitude of the applied load, said insulator being provided on said carrier and said thick film conductor being provided on said insulator.

4. The scale of claim 1, wherein said platform member has a side facing said base member and said thick film conductor is provided at said side of said platform member.

5. The scale of claim 1, further comprising zero point selector means including a microprocessor connected with said conductor and provided on said one member.

6. The scale of claim 1, further comprising a scale which is calibrated to indicate the magnitude of the load upon said platform member, a mobile pointer adjacent said calibrated scale, and means for moving said pointer with reference to said calibrated scale including an energy source and amplifier means in circuit with said conductor.

7. The scale of claim 1, wherein said conductor contains a silver palladium alloy.

8. The scale of claim 1, wherein said conductor has an undulate shape.

* * * * *